United States Patent [19]

Engleman

[11] Patent Number: 4,531,754
[45] Date of Patent: Jul. 30, 1985

[54] RADIAL BRAKING SYSTEM

[76] Inventor: Christian F. Engleman, 213 E. Market St., Louisville, Ky. 40202

[21] Appl. No.: 429,181

[22] Filed: Sep. 30, 1982

[51] Int. Cl.³ .......................... B60B 1/14; B62L 1/08; B62L 1/14
[52] U.S. Cl. .................................. 280/261; 188/24.11; 188/24.13; 188/24.17; 188/24.22; 188/250 B; 188/250 G; 192/5; 301/67; 301/95; 301/98
[58] Field of Search .................. 280/261, 259; 301/73, 301/79, 67, 98, 95; 188/24.11, 24.17, 24.22, 24.13, 73.1, 250 B, 250 E, 234, 247, 250 G; 192/5, 10

[56] References Cited

U.S. PATENT DOCUMENTS 2,879,866  3/1959  Newell ............................. 188/234

FOREIGN PATENT DOCUMENTS

| 9254    | 9/1902 | Austria ........................... 188/24.11 |
| 410164  | 5/1910 | France ........................... 192/5 |
| 592647  | 8/1925 | France ........................... 188/24.11 |
| 1242605 | 8/1960 | France ........................... 188/250 B |
| 254579  | 8/1927 | Italy ............................. 188/24.11 |
| 362287  | 8/1938 | Italy ............................. 301/98 |
| 691582  | 5/1953 | United Kingdom ............. 188/24.17 |
| 2005366 | 4/1979 | United Kingdom ............. 188/250 B |

Primary Examiner—David M. Mitchell
Assistant Examiner—Mitchell J. Hill
Attorney, Agent, or Firm—Wm. R. Price

[57] ABSTRACT

An improved radial braking system uses the power of the cyclist's back pedaling to bring the braking member into contact with the rim of the wheel. The system allows for the direct contact of the braking member with the middle portion of the outer surface of the rim rather than to the side of the rim, as is common with the caliper type brakes. A rim having a laterally disposed lip for mounting of the spoke allows for an unobstructed middle portion for contact with the braking member.

9 Claims, 11 Drawing Figures

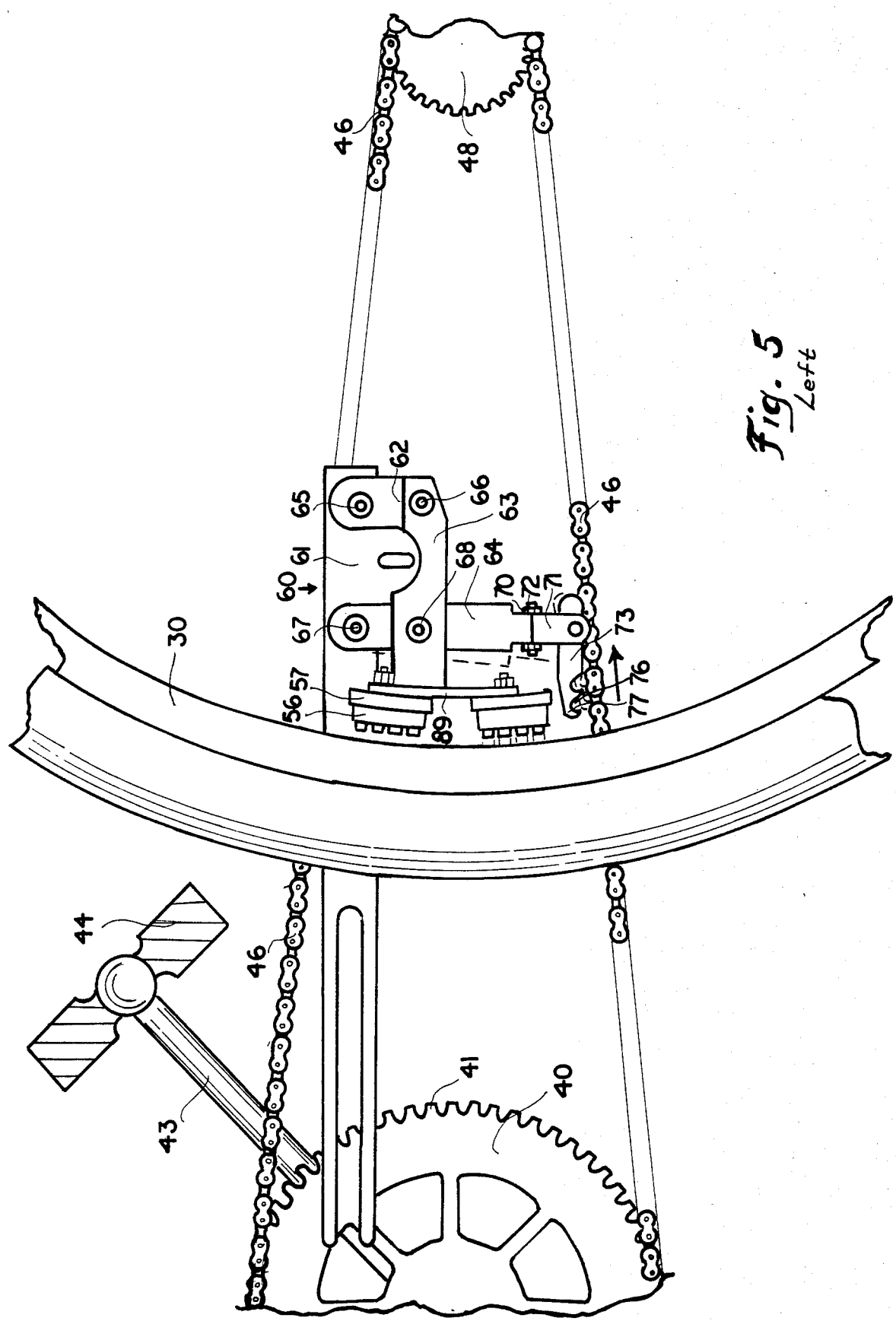
Fig. 5 Left

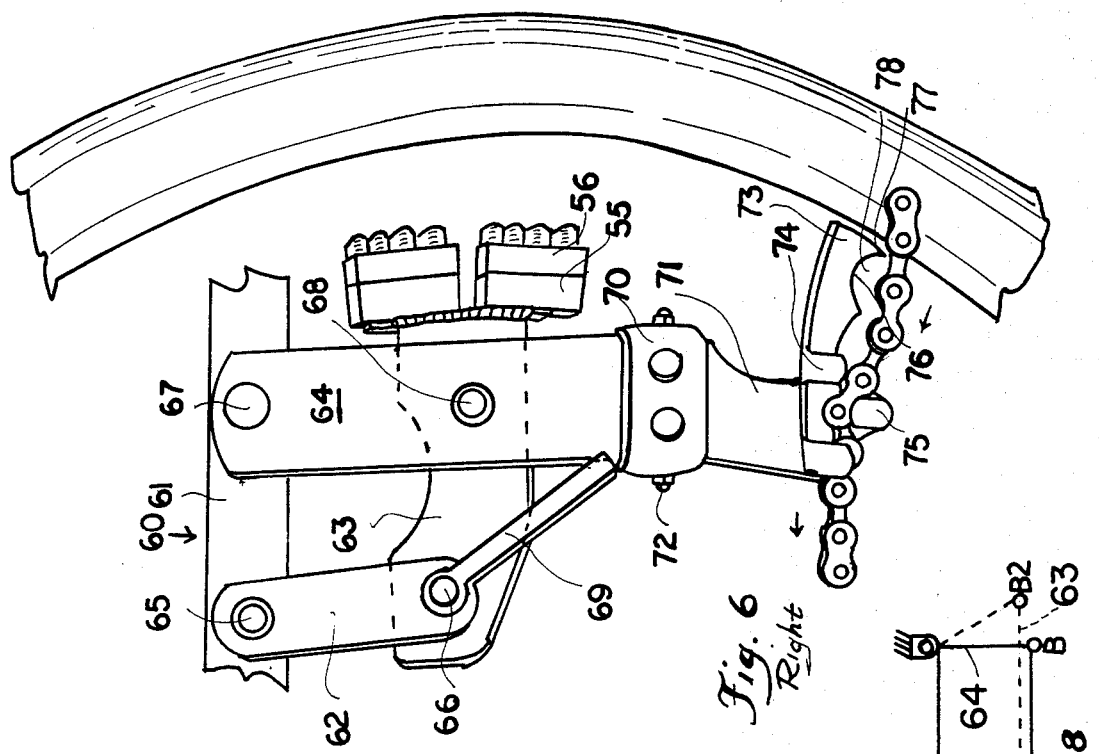
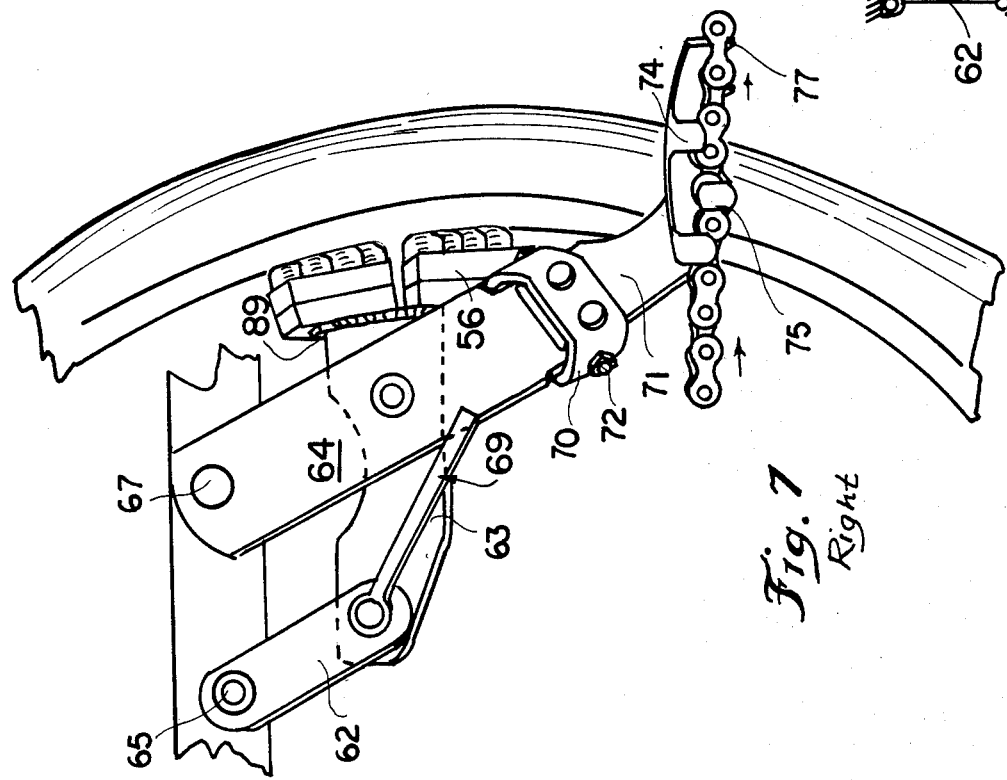

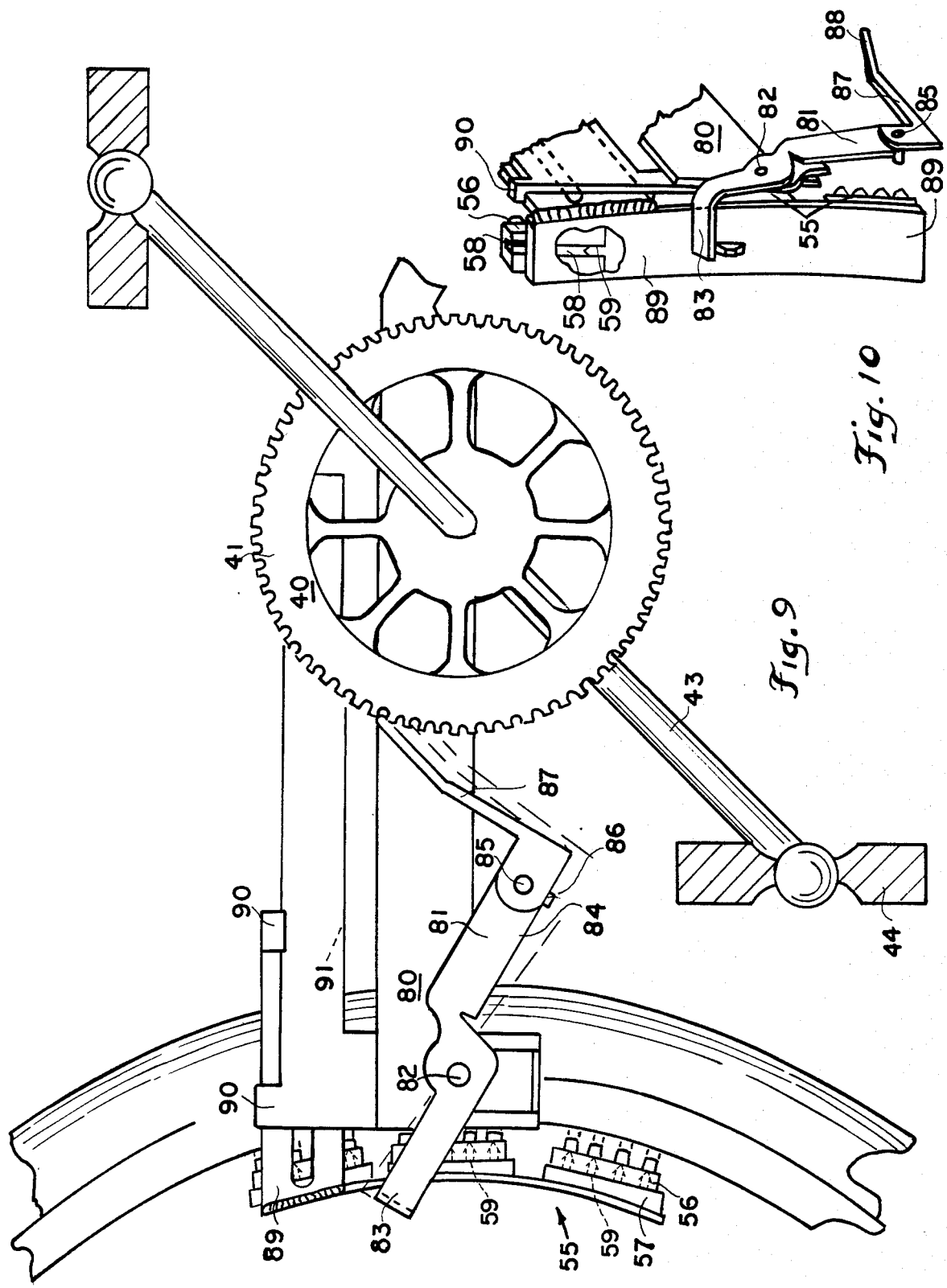

RADIAL BRAKING SYSTEM

FIELD OF THE INVENTION

This invention relates to an improved radial braking system. More specifically, this invention relates to an improved radial braking system for use on bicycles which utilizes the back pedaling pressure of the cyclist to move the braking member into engagement with the rim.

BACKGROUND OF THE INVENTION

Caliper type brakes were introduced into the United States sometime in the late 1950s or early 1960s and provided a much more economical and simplified method of braking than had previously been the practice with the well known coaster brakes. The caliper type brakes commonly consist of sixty or more pieces. These brakes, front and rear, have a great number of undesirable features inherent in their design. The many pieces provide a large number of sources for trouble from rust, wear, breakage, misalignment, misadjustment, jamming as in a cable rusted tightly in its housing or on the other hand, loosening up as from any of the many nuts working loose. Also, the brakes take up a lot of space, the cables can become snagged and pulled out of place along with the hand levers, perhaps pulling the handlebars off center also. Wear of the rubber brake blocks can necessitate adjusting to take up the slack, so that when new blocks are installed the proper amount of slack must be readjusted in. Likewise, a front brake on a bicycle can easily provide the rider with danger, instead of safety, especially if there is an emergency and the rider forgets and applies power excessively, or exclusively, to the front brake. If there is dirt, loose rock, ice, oil, wet grass or something else which can interfere with the tire keeping a good grip on the riding surface, the rider is all too apt to take a high speed crash, or even be catapulted over the handlebars for a so-called "header". On a curve or turn the danger is especially great due to the fact that when these brakes are applied, friction pulls the caliper legs at right angles to their length, chattering and loss of braking friction often occurs, especially in wet weather. A careful and time-consuming examination and lubrication at many points is required in order to keep this type of brake at top efficiency. Even so, many riders, expecially elderly folk and the younger ones, find these caliper, hand-lever brakes inconvenient and difficult to use properly.

SUMMARY OF THE INVENTION

The purpose of this invention is to provide an improved bicycle brake which will be more effective and safe than the so called caliper brakes.

According to my invention, back pedaling of the cyclist, which is almost second nature to cyclists accustomed to the coaster type brake, is used to supply the power for engaging the braking member with the rim of the rear wheel. In a preferred embodiment, the braking member is applied directly to the middle portion of the rim, although it is within the scope of this invention to use the power developed by the rear pedaling of the cyclist to operate a caliper type brake on the rear rim. This is accomplished by the use of a motion translation means which may be mounted in operative relation with the brake member to translate the back pedaling of the cyclist to braking pressure on the rear rim of the bicycle wheel. My improved brake is easy to install and use, positive and powerful in action, compact and easy to inspect and oil, silent and never needs adjustment. Since it has the rubber friction blocks in line, or tandem, it works better even in wet weather. The rubber block can be made as one continuous strip, with a groove running axially lengthwise along the mounting side, $\frac{1}{8}''$ deep and $1/16''$ wide, and forced on barbs projecting from the brake member bracket, as hereinafter shown. This strip can easily be removed when worn out and replaced with a new one, using only the hands and needs no adjustment throughout its life. The brake is designed to be made principally from stampings from steel stock and in its simplest form has only three parts besides the rubber block or blocks. The base can be permanently fastened to the bicycle frame, at time of manufacture or later and the brake is out of the way where it is not likely to be damaged. Being foot operated, it is very easy to use.

BRIEF DESCRIPTION OF THE DRAWINGS

FIG. 5 is a view from the left of the rear section of a multi-speed bicycle illustrating the relationship of the motion translation means in the form of a classic four bar linkage and the radial braking members of this invention.

FIG. 6 is an exploded view of the motion translation means in the form of a four bar linkage, viewed from the right of the bicycle showing the brake members in non-engaged position.

FIG. 7 is a view from the right illustrating the same mechanism as in FIG. 6 but in brake engagement relation.

FIG. 8 is a diagram of the classic four bar linkage as applied to the present invention which shows in full lines the four bar linkage in non-braking engagement and in phantom lines the four bar linkage in braking engagement.

FIG. 9 illustrates another modification of the present invention, again viewed from the left, in which the motion translation means is in the form of a lever, in which the weight end engages with a braking member bracket slidably mounted on a fixed standard for braking engagement with the outer surface of the middle portion of the rim.

FIG. 10 is an exploded view, partially in perspective illustrating the relationship of the weight end of the lever member and the braking member bracket slidably mounted on a stationary bracket member.

DESCRIPTION OF THE PREFERRED EMBODIMENT

Figure 1:
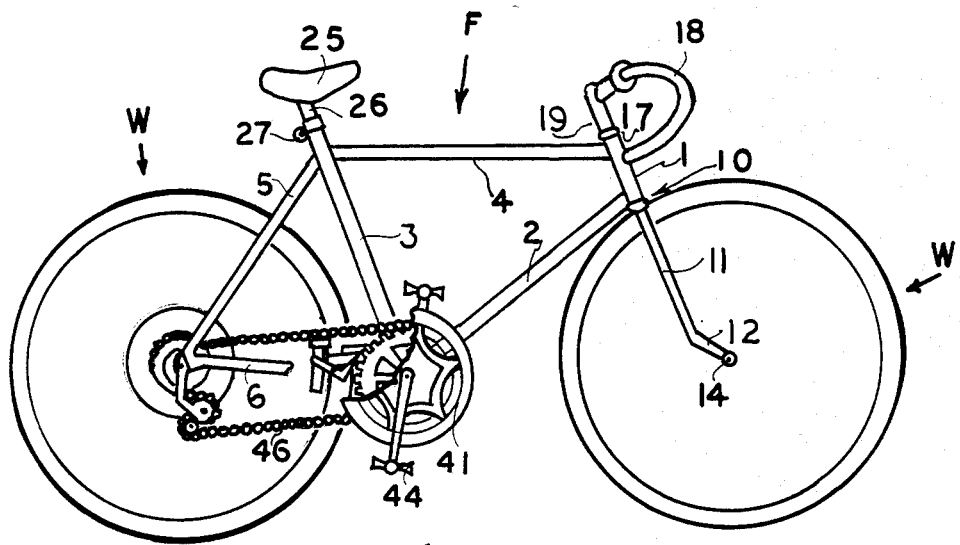
FIG. 1 is a side elevation of a conventional multi-speed bicycle which is equipped with one embodiment of the present invention.
Figure 2:
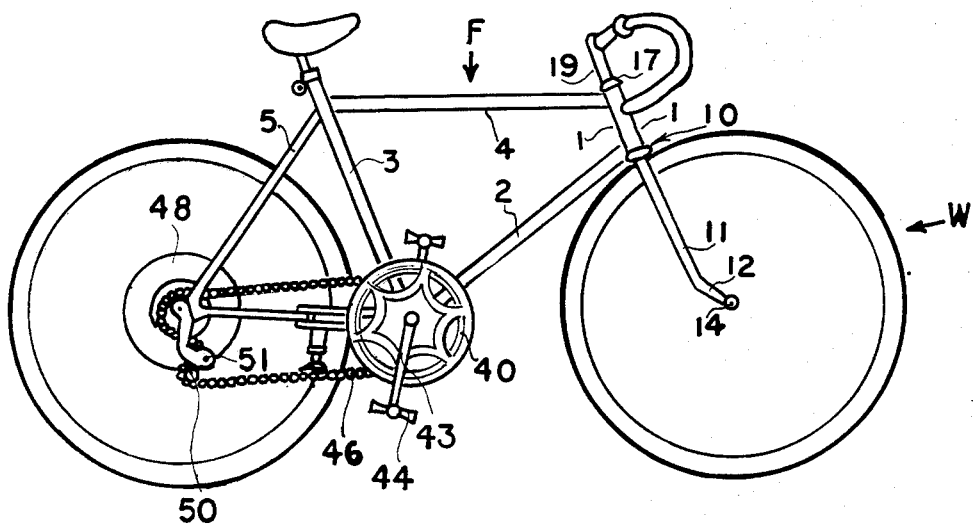
FIG. 2 is a side elevation of a multi-speed bicycle which is equipped with another embodiment of the present invention in order to show the relationship therewith to the conventional bicycle.
Figure 3:
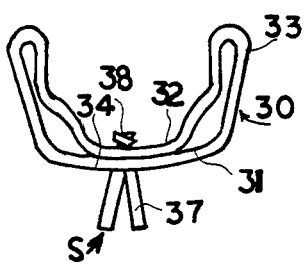
FIG. 3 is a sectional view illustrating the standard tubular rims and the disposition of spokes mounted therein.

Referring now to the drawings in detail, a conventional multi-speed multi-geared bicycle is illustrated in FIGS. 1 and 2 and consists of a Frame F having a head tube 1, down tube 2, a seat tube 3 and a cross bar 4. Projecting from the down tube 3 is a seat stay 5, and a chain stay 6. Chain stay 6 has been broken off for ease of illustration. At the front of the bicycle is a fork 10 bifurcated to form two fork blades 11 which terminate in bifurcated fork tips 12 for journaling of the axle and the hub member 14 to the front wheel W. The handlebar 18 contains a stem 19 which projects through the head set 17 into the head tube 1. Saddle 25 has a seat post 26 which slides into seat tube 3 and is locked into position by seat lug 27. The wheel W consists of a rim 30 having an outer surface 31 and an inner surface 32 and two upwardly projecting walls 33. The standard tubular rim is shown in FIG. 3 with the spokes S having shank 37 and nipple 38 mounted in the middle portion 34 thereof.

Figure 4:
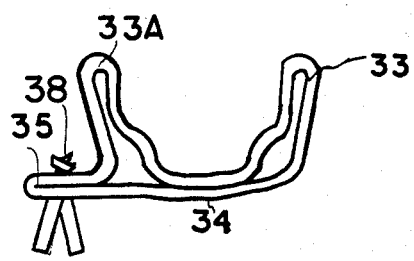
FIG. 4 is a sectional view of an improved tubular rim designed so that a lip projects laterally from one of the walls for providing the mounting space for the spokes.

In order to provide for more braking surface in the middle portion 34 of the tim 30, the tubular rim is formed as illustrated in FIG. 4 so that wall 33A has a laterally extending lip 35 for provision of the spoke nipples 38. This allows for more braking surface for the braking member 55 and permits better equalization of spoke angles laterally with respect to the hub for more strength. Additionally, the left hub flange can be positioned further to the left for more strength. Spokes can be replaced more easily without letting the air out of the tire or removing the tire. Additionally, liners are not needed to protect the tube from spokes and nipples. Furthermore, less moisture is trapped so rusting is minimized. The arrangement provides additional room on the right of the spokes for the seven sprocket cluster. This structure can also be used for the cast or "mag" wheels. Alternately, some benefit can be obtained by offsetting the spokes to the left in the conventional rim illustrated in FIG. 3, but the rim of FIG. 4 is preferred.

The sprocket wheel 40 contains sprocket teeth 41 and is driven by means of the crank arm 43 and the pedal 44 by the forward pedaling of the cyclist. The chain 46 is trained around the sprocket 40 and engages with the teeth 41 and with the teeth of the rear sprocket 48 which is formed in the form of a gear cluster, now shown. The tension wheel for the chain 46 is designated by the numeral 50 and the rear derailleur 51 is arranged in operative relation therewith. The braking member 55 consists of brake pad 56 and brake block 57. The groove 58 of the brake blocks 57 is mounted as is shown in FIG. 10 onto barbs 59 (illustrated in phantom lines in FIGS. 9 and 11) projecting from braking member bracket 89. The motion translation means, illustrated in FIGS. 5, 6 and 7 is in the form of a classic four bar linkage. The linkage consists of a stationary bar 61, a crank bar 62, the coupler bar 63 and the lever bar 64, held together by pins 65, 66, 67 and 68. The crank bar 62 contains a follower member in the form of a projecting finger 69 which engages with the lateral surface of the lever bar 64. At the lower end of the lever bar 70 is located a bracket member to which a link 71 is pivotably attached by pin 72 so as to allow for medial and lateral movement upon shifting of the gears from one sprocket of the rear gear cluster to the other. The link is attached at the bottom to a chain support bracket 73 containing depending finger 74 and upperly disposed fingers 75. The fingers 74 and 75 support the links of the chain 46 as is shown in FIG. 6. Thus, as the cyclist pedals the sprocket wheel 40 in a forward direction, the links of the chain pass between the upwardly disposed finger 75 and the downwardly disposed finger 74 and out of engagement with the link engaging depression 76 which consists of link engaging teeth 77 and cut out concave portions 78.

However, as is clearly shown in FIG. 7, upon back pedaling by the cyclist, the chain 46 moves in the direction shown by the arrows, and the links become engaged with the teeth 77 of the link engaging depression 75. This then pulls the lever portion 64 forwardly so that the coupler member 63 which is welded to the braking member bracket 89 is pulled forwardly so that the brake pad 56 comes into engagement with the middle portion 34 of the outer surface 31 of the rim. This action is shown diagrammatically in FIG. 8 in which the stationary member is designated 61, the crank member 62, the coupler member 63 and the lever member 64. In the non-engaging position illustrated by A and B, the coupler member 63 is arranged so that the brake members attached thereto would not be in braking engagement with the rim 30. However, as is shown in phantom lines, when the coupler member 63 and the lever member 64 move forwardly to point B2, the braking members 55 move forwardly so that the braking pads 56 come into engagement with the rim.

As is best shown in FIG. 9, and in FIG. 10, a lever arm 81 fulcrumed at point 82 to the stationary bracket 80 is used to move the brake member brackets 89 forwardly into braking engagement with the rim 30 of the wheel. The braking member bracket 89 contains bent over fingers 90 and 91 slidingly engaged on the upper portion of the stationary bracket 80.

The power end 84 of the lever member terminates with a projecting arm 87 which is pinned at point 85 for a limited backward axial movement. This allows then for the projecting arm to act as an overriding pawl 88 relative to the teeth 41 of the forwardly pedaled sprocket wheel 40. Upon back pedaling by the cyclist, the end of the pawl 88 engages in one of the indentations between the teeth 41 of the sprocket wheel and the pivoting movement at point 85 is checked by stop 86. This pushes power arm 84 down into the position shown in phantom lines. The weight end 83 of the lever member thus comes into engagement with the brake member bracket 89 and allows the entire braking assembly 55 to slide forwardly on the stationary bracket 80. This then brings the brake pad 56 of the braking member 55 into braking engagement with the middle portion 34 of the outer surface 31 of the rim 30.

Figure 11:
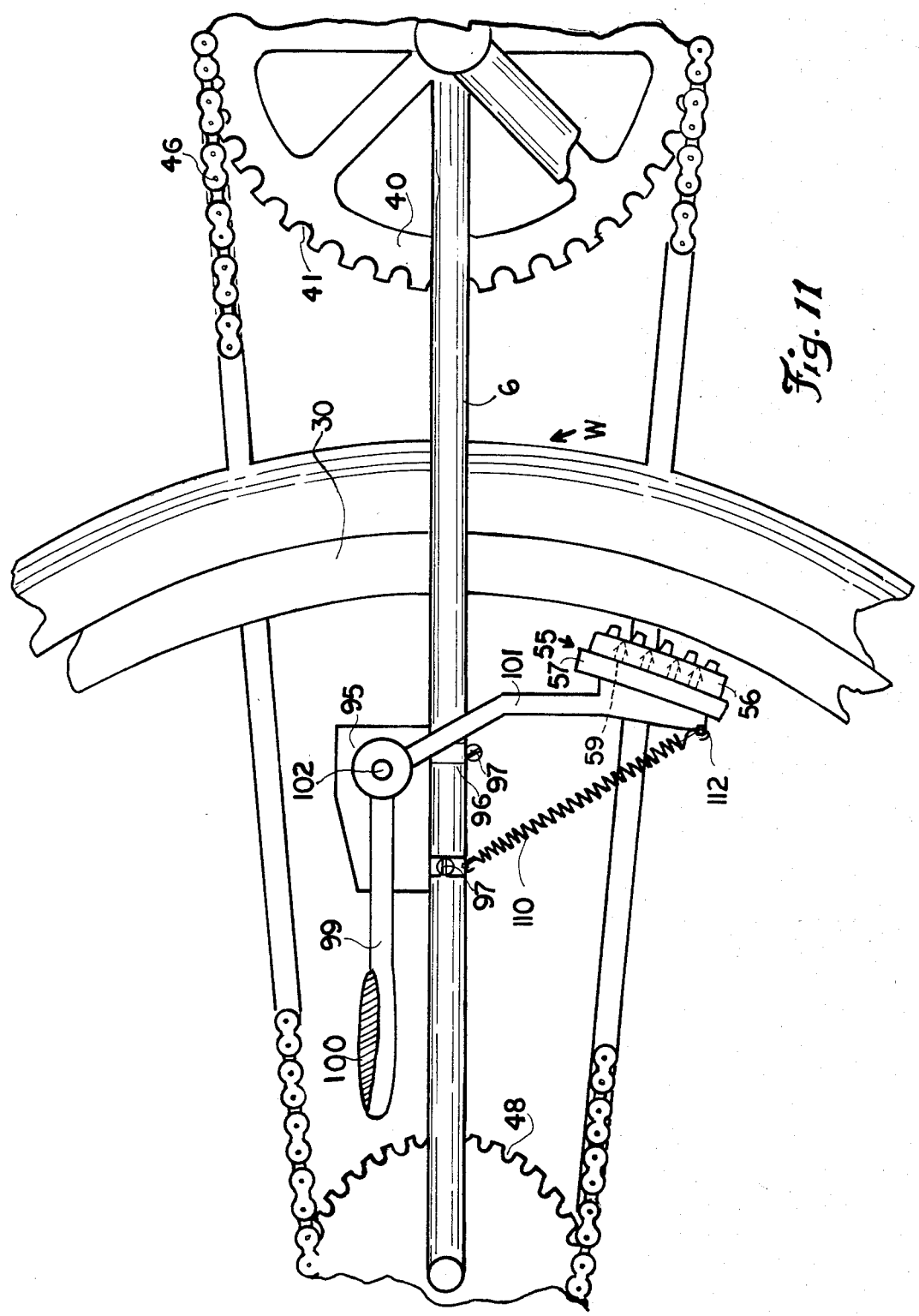
FIG. 11 is a fragmentary view, viewed from the right of the motion translation means of this invention, illustrating a lever pivotably mounted upon a bracket for engaging the back pedaling pressure of the cyclist to bring the braking member into engagement with the rim of the rear wheel.

In the embodiment shown in FIG. 11, an even simpler lever arrangement is illustrated. In this arrangement a mounting bracket member 95 is attached by clamps 96 and bolt 97 to the chain stay 6 of the frame of the bicycle. The lever member 98 having a power arm 99 and a weight arm 101 is fulcrumed in the stationary bracket with pin 102. Spring member 110 attached at point 111 to the chain stay and at point 112 to the weight arm 101 of the lever, holds the braking member 55 normally out of engagement with the rim 30. However, upon back pedaling by the cyclist and engagement of the cyclist's heel with the heel engaging portion 100, the weight arm 101 moves forward thus moving the braking member into engagement with the rim.

Many modifications will occur to those skilled in the art from the detailed description hereinabove given which is meant to be illustrative in nature and non-limiting except so as to be commensurate in scope with the appended claims.

I claim:

1. For use with a bicycle, including a frame, wheel forks, wheels having rim and hub members and being rotably mounted in said wheel forks, sprocket and chain means for imparting rotation to at least one of said wheels, pedal means rotably mounted to said frame in operative relation with said sprocket and chain means to impart forward rotation to said sprocket upon forward pedaling of the cyclist:
   A. an improved radial braking system which comprises:
      1. a brake member mounted near the outer surface of one of said rim members, but normally out of contact therewith;
      2. motion translation means, in operative relation with said brake member, for moving said brake member into braking engagement with the rim member;
      3. power means in operative relation with said motion translation means to impart motion to said motion translation means;
      4. said rim member comprising:
         a. an unobstructed middle portion for the provision of maximum braking surface;
         b. two wall portions; and
         c. a laterally-disposed lip portion, said lip portion extending laterally of one of said wall portions, and
         d. spoke members radiating from said laterally-disposed lip portion.

2. An improved rim, as defined in claim 1, fabricated of tubular steel, in which said spoke members are mounted through holes in said laterally disposed lip portion.

3. A rim, as defined in claim 1, in which said rim and spoke members are permanently cast from light weight metal alloys.

4. For use with a radial braking system, as defined in claim 1, an improved rim and spoke combination, comprising:
   A. an enlarged middle portion for the provision of more braking surface,
   B. the improvement of mounting holes offset to the side of the middle portion of said rim member whereby the spokes are mounted laterally from the middle of said rim member.

5. An improved radial braking system, as defined in claim 1, in which said brake member comprises:
   A. a curved, elongated bracket, having barbs projecting therefrom;
   B. a flexible rubber braking block, having an elongated groove axially aligned lengthwise on its inner surface for mounting on said barbs;
   C. a portion of said breaking block adapted for engagement with said middle portion of said rim member.

6. An improved radial braking system, as defined in claim 5, in which said curved bracket has a curvature which complements the curvature of the inner surface of said rim member.

7. For use with a radial braking system, an improved rim and spoke combination comprising a rim having:
   A. an unobstructed middle portion for the provision of maximum braking surface;
   B. two wall portions; and
   C. a laterally-disposed lip portion, said lip portion extending laterally of one of said wall portions; and
   D. spoke members radiating from said laterally-disposed lip portion.

8. An improved rim, as defined in claim 7, fabricated of tubular steel, in which said spoke members are mounted through holes in said laterally-disposed lip portion.

9. A rim, as defined in claim 7, in which said rim and said spoke members are permanently cast from light-weight metal alloys.

* * * * *